(12) United States Patent
Schweickert et al.

(10) Patent No.: US 8,694,416 B2
(45) Date of Patent: Apr. 8, 2014

(54) INTEGRATED ORDER MATCHING SYSTEM COMBINING VISIBLE AND HIDDEN PARAMETERS

(71) Applicant: Deutsche Börse AG, Frankfurt am Main (DE)

(72) Inventors: Uwe Schweickert, Frankfurt am Main (DE); Miroslav Budimir, Frankfurt am Main (DE); Peter Gomber, Heiligenroth (DE)

(73) Assignee: Deutsche Boerse AG, Frankfurt am Main (DE)

( * ) Notice: Subject to any disclaimer, the term of this patent is extended or adjusted under 35 U.S.C. 154(b) by 0 days.

(21) Appl. No.: 13/720,972

(22) Filed: Dec. 19, 2012

(65) Prior Publication Data

US 2013/0110701 A1 May 2, 2013

Related U.S. Application Data

(62) Division of application No. 10/928,265, filed on Aug. 30, 2004, now Pat. No. 8,374,946.

(30) Foreign Application Priority Data

Apr. 23, 2004 (EP) ..................................... 04009752

(51) Int. Cl.
*G06Q 40/00* (2012.01)
(52) U.S. Cl.
USPC ........................................................... 705/37

(58) Field of Classification Search
USPC ........................................................... 705/37
See application file for complete search history.

(56) References Cited

U.S. PATENT DOCUMENTS

| | | | |
|---|---|---|---|
| 2003/0177086 A1* | 9/2003 | Gomber et al. ................. | 705/37 |
| 2004/0143538 A1* | 7/2004 | Korhammer et al. ........... | 705/37 |
| 2006/0136318 A1* | 6/2006 | Rafieyan et al. ................ | 705/37 |
| 2007/0226118 A1* | 9/2007 | Gill ................................. | 705/37 |

OTHER PUBLICATIONS

Instinet Corporation; "Instinet Trading Portal"; Reference 2.0; pp. 1-113, 2003.
Bloomberg Tradebook U.S. Equity User Manual; Apr. 2002 (New York); pp. 1-68.

* cited by examiner

*Primary Examiner* — Samica L Norman
(74) *Attorney, Agent, or Firm* — Marc S. Kaufman; Reed Smith LLP

(57) ABSTRACT

A system and method for providing back-end functionality for order processing in electronic order book trading. A sell/buy order is received comprising a lower/upper limit and a conditional lower/upper limit defining a conditional selling/buying price range for executing the sell/buy order under certain selling/buying conditions. It is determined whether the selling/buying conditions are fulfilled, including determining whether the sum of the first and second part of the buy/sell order is superior or equal to a threshold volume. The sell/buy order and the buy/sell order are executed against each other if at least the selling/buying conditions are fulfilled. Embodiments allow rapidly executing large trading interests with minimized market impact and opportunity costs.

12 Claims, 11 Drawing Sheets

INTEGRATED ORDER MATCHING SYSTEM COMBINING VISIBLE AND HIDDEN PARAMETERS

This application is a Divisional of application Ser. No. 10/928,265, filed on Aug. 30, 2004 (now pending), which claims priority to European Application No. 04009752.9, filed on Apr. 23, 2004, the contents of which are herein incorporated by reference.

BACKGROUND OF THE INVENTION

1. Field of the Invention

The present invention relates to computer systems and corresponding methods and computer program products for processing orders in a security trading system, and in particular to order processing techniques in which orders are matched beyond their visible limits disclosed to the market for execution purposes.

2. Description of the Related Art

Besides exchange floor trading, electronic trading systems have become important places where securities are bought and sold. A known trading platform for processing electronic orders is Xetra (Exchange Electronic Trading), which is a distributed system whose components are connected according to the client-server principle. Some of the Xetra functionality is decentralized on the participants' installations, so-called front ends, and some of it is implemented centrally on the Xetra back end of the exchange. The participants' front end installation can also be set up based on the client-server principle, and the use of a programmable interface makes the front end an open system to which any number of different participants' applications can be connected or added on.

A typical trading platform is shown in FIG. 1. Customer computers 110 and 130, the front ends, are connected to the central order book exchange system 140 representing the back end of the trading platform through a WAN (Wide Area Network) 135 which spans a large geographic area. The internet is an example of a WAN 135. The customer computers can be stand-alone systems, such as customer computer 130, or have a distributed system architecture such as customer computer 110. Distributed customer computers 110 usually include a number of customer clients 115 connected to a customer server 125 through a LAN (Local Area Network) 120 that is confined to a building or a group of buildings, e.g., the branches of a bank. The customer server 125 is coupled to the WAN 135 for communicating with the back end 140.

The central order book exchange system 140 comprises a trading system 145. The trading system 145 authenticates the remote customer computers 110 and 130 and stores the orders received there from over the WAN 135. It then matches the orders, executes suiting ones and clears the trades simultaneously. The trading system 145 also reports the last sale as well as all orders as they are received and notifies the traders at the remote terminals 110 and 115 of filled or unfilled orders. It can access its memory to report various market conditions and transactions and maintains a detailed trade history for each trade member. Finally, it provides the necessary trade data for settlement and compliance with the rules of the exchange.

Further, the central order book exchange system 140 may include a clearing system 150 connected to the trading system 145 and the customer computers 110 and 130 via the WAN 135 for clearing all trades based upon the exchange rules. A compliance system 155 within the central order book exchange system 140 communicates with the trading system for tracking and reporting the trading activities of each trade member as well as detecting trading irregularities. It provides information to a control terminal 160 to answer inquiries from exchange officers who ensure that the system rules are being complied with. A live surveillance system 165 is coupled to the trading system 145 to enable exchange officers to review all information relating to trading.

With Xetra, all market participants have equal access to the trading platform regardless of their geographic location. Unlike exchange floor trading, electronic order processing makes it possible for orders to be entered in the system and automatically matched. Further, trading in equities and warrants is possible on a single trading platform. It is further possible to individualize transaction requests with regard to validity and way of execution. Selection between limit and market orders takes into consideration the different demands of the market participants as to the speed of order execution.

One basis of securities trading worldwide, no matter whether the trading takes place on a regulated exchange or other marketplaces, is order book trading. In order book trading, orders placed by investors in a given security form an order book and are executed according to well-defined principles, usually to price-time priority, i.e., according to the limit of the order and the time the order has been entered into the trading system. The order with the highest priority will be the first to be executed if an execution becomes possible. Executions are possible if the limit of the order with the highest priority on the buy side of the order book is higher than or equal to the order limit with the highest priority on the sell side of the order book. The execution or matching of orders also follows well-defined principles where the prevailing trading form also influences the exact procedure such as continuous trading and auction trading.

Exposing large trading interests to a relevant market causes adverse price effects, also referred to as the market impact, by information spillover to the disadvantage of the exposed trading interests. In addition, large trading interests are moving away the opposite market side by own trading activity deteriorating their overall execution price. For these market conditions, traders are reluctant to reveal their large trading interests all at once to avoid market impact costs, and have to work total trading interests in smaller orders over time in anonymous order book trading or bilaterally search for counterparties off the order book and execute the interests in non-anonymous over-the-counter markets.

Further, when entering large trading interests as patient limit orders or aggressive market orders, i.e., unlimited orders that are to be executed at the next price determined, any trader faces the problem either to accept market impact costs by aggressively matching his trading interests or to risk opportunity costs by patiently waiting in the order book for execution.

In order to address the above disadvantages, prior art trading systems already provide an extended set of order types. Such conventional approaches are illustrated in FIG. 2.

FIG. 2 schematically depicts the content of an order book according to prior art. The order book consolidates trading interests by buy orders 210 to 250 and sell orders 260 to 270 on two market sides: buy orders 210 to 250 on the bid market side and sell orders 260 to 270 on the ask market side. The orders comprise a number of characterizing parameters, e.g., parameters representing the order size or limit. The characterizing parameters of an order can be visible to all the customers using the securities trading system or hidden from (invisible to) part of the customers, e.g., from all the customers except the originator of the order. Order sizes, i.e., the number of shares to be bought or sold also referred to as order volumes, are aggregated by each price limit and buy (sell)

orders are displayed in descending (ascending) order by their visible price limit $L_v$ in the order book with their aggregated visible size. The order queue on each market side builds the market depth. The distance between the visible limits of the highest buy order 250 and the lowest sell order 260 marks the inside market or quoted spread. Thus, in the example depicted in FIG. 2, the inside market extends from 54.16 to 54.19.

Order execution and price discovery in continuous electronic order book trading in prior art always takes place at the inside market and usually follows price-time priority in matching.

The extended set of order types in electronic order book trading comprises iceberg orders. An iceberg order 210 comprises a visible limit $L_v$, a visible peak size, and a hidden size as characterizing parameters. The overall volume of the iceberg order 210 is the sum of the peak size and the hidden size. Only the visible limit and the peak size are disclosed to the market. The hidden size remains undisclosed, although available for matching in continuous trading if the order is at the inside market and auction trading. Once the peak size is fully executed, it gets refreshed out of the hidden size of the iceberg order 210.

Discretionary orders 240 are characterized by a volume V, a visible limit $L_v$, and a hidden limit $L_H$. While the volume V and the visible limit $L_v$ are disclosed to the market, the hidden limit $L_H$ remains undisclosed to the market. A discretionary order 240 can be matched not only with contra-orders within the visible limit $L_v$ but also with contra-orders between the visible limit $L_v$ and the hidden limit $L_H$. Accordingly, the discretionary buy order 240 of the example depicted in FIG. 2 could be executed against the sell order 260.

Finally, the extended set of order types used in conventional security trading comprises pegged orders. A pegged order 250 comprises a visible limit $L_v$ floating with the market in a security trading system. A pegged order 250 can be pegged to a market characterizing price, e.g., the limit of the best order among the remaining orders of the same market side, the limit of the best order on the opposite market side, or the middle of the inside market. By means of a distance parameter Δ, a fixed distance to the market characterizing price the pegged order 250 is pegged to can be specified so that the pegged order 250 floats with the market characterizing price, always staying at the specified distance therefrom. In the example illustrated in FIG. 2, the pegged buy order 250 is pegged to the remaining best buy order 230 by a distance of 0.02. Besides the distance parameter Δ, a pegged order 250 comprises an ultimate limit $L_{ult}$ acting as a constraint on how far the visible limit can float. A pegged order 250 can be executed only against contra-orders within the visible limit $L_v$.

According to prior art, electronic order book trading enables buy (sell) orders to match exclusively at the best ask (bid) in continuous trading. Price formation and order matching takes place at the inside market only. This usually leads to the disadvantage that orders within the opposite market depth cannot participate in order matching whereby the time an order is patiently waiting in the order book for execution is increased. Therefore, conventional electronic order book trading still causes considerable opportunity costs.

Further, in prior art security trading systems, only front-end functionality is provided, i.e., an order, even though containing hidden parameters, can only be matched with visible parameters of the contra-orders within the order book. This may lead to the problem that an order is not executed since the visible limits of the opposite market side do not match the visible or hidden limit of the order, although a hidden limit of the opposite market side would have matched. Thereby, the time the order is patiently waiting in the order book for execution is increased again resulting in opportunity costs which can be avoided by the proposed Volume Discovery back-end functionality.

SUMMARY OF THE INVENTION

Given these problems with the prior art techniques, it is the object of the invention to provide a method of operating a computer system for processing orders in a security trading system such as an automated exchange, a corresponding computer program product, and computer systems that allow fast execution of large trading interests with minimized market impact and opportunity costs in continuous trading.

This object is solved by the invention as defined by the independent claims. Preferred embodiments are specified in the dependent claims.

According to an embodiment, there is provided a computer system arranged for processing orders that is operable in a security trading system. The computer system comprises a means for receiving a sell order comprising a lower limit and a conditional lower limit. The lower limit and the conditional lower limit define conditional, new selling price ranges in which the sell order can be executed under certain selling conditions. The computer system further comprises a means for receiving a buy order comprising an upper limit, a visible buy volume parameter and a hidden buy volume parameter. The visible buy volume parameter is specifying a first part of the volume of the buy order intended to be disclosed to all the customers of the security trading system. The hidden buy volume parameter is specifying a second part of the volume of the buy order intended not to be disclosed to all the customers of the security trading system. Furthermore, the computer system comprises a means for determining whether the selling conditions are fulfilled, including determining whether the sum of the first part and the second part of the volume of the buy order is superior or equal to a threshold volume. Moreover, the computer system comprises a means for executing the sell order and the buy order against each other if at least the selling conditions are fulfilled.

According to another embodiment, there is provided a computer system arranged for processing orders that is operable in a security trading system. The computer system comprises a means for receiving a buy order comprising an upper limit and conditional new upper limits. The upper limit and the conditional new upper limits define a conditional buying price range in which the buy order can be executed under certain buying conditions. The computer system further comprises a means for receiving a sell order comprising a lower limit, a visible sell volume parameter and a hidden sell volume parameter. The visible sell volume parameter is specifying a first part of the volume of the sell order intended to be disclosed to all the customers of the security trading system. The hidden sell volume parameter is specifying a second part of the volume of the sell order intended not to be disclosed to all the customers of the security trading system. Furthermore, the computer system comprises a means for determining whether the buying conditions are fulfilled, including determining whether the sum of the first part and the second part of the volume of the sell order is superior or equal to a threshold volume. Moreover, the computer system comprises a means for executing the buy order and the sell order against each other if at least the buying conditions are fulfilled.

According to a further embodiment, a method of operating a computer system for processing orders in a security trading system is provided. A sell order comprising a lower limit and a conditional lower limit is received. The lower limit and the conditional lower limit define a conditional selling price range in which the sell order can be executed under certain selling conditions. A buy order comprising an upper limit, a visible buy volume parameter and a hidden buy volume parameter is received. The visible buy volume parameter is specifying a first part of the volume of the buy order intended to be disclosed to all the customers of the security trading system. The hidden buy volume parameter is specifying a second part of the volume of the buy order intended not to be disclosed to all the customers of the security trading system. It is determined whether the selling conditions are fulfilled, including determining whether the sum of the first part and the second part of the volume of the buy order is superior or equal to a threshold volume. The sell order and the buy order are executed against each other if at least the selling conditions are fulfilled.

According to a yet another embodiment, a method of operating a computer system for processing orders in a security trading system is provided. A buy order comprising an upper limit and a conditional upper limit is received. The upper limit and the conditional upper limit define a conditional buying price range in which the buy order can be executed under certain buying conditions. A sell order comprising a lower limit, a visible sell volume parameter and a hidden sell volume parameter is received. The visible sell volume parameter is specifying a first part of the volume of the sell order intended to be disclosed to all the customers of the security trading system. The hidden sell volume parameter is specifying a second part of the volume of the sell order intended not to be disclosed to all the customers of the security trading system. It is determined whether the buying conditions are fulfilled, including determining whether the sum of the first part and the second part of the volume of the sell order is superior or equal to a threshold volume. The buy order and the sell order are executed against each other if at least the buying conditions are fulfilled.

According to still another embodiment, a computer program product for processing orders in a security trading system is provided. The computer program product comprises a computer program means for receiving a sell order comprising a lower limit and a conditional lower limit. The lower limit and the conditional lower limit define a conditional selling price range in which the sell order can be executed under certain selling conditions. Further, the computer program product comprises a computer program means for receiving a buy order comprising an upper limit, a visible buy volume parameter and a hidden buy volume parameter. The visible buy volume parameter is specifying a first part of the volume of the buy order intended to be disclosed to all the customers of the security trading system. The hidden buy volume parameter is specifying a second part of the volume of the buy order intended not to be disclosed to all the customers of the security trading system. Furthermore, the computer program product comprises a computer program means for determining whether the selling conditions are fulfilled, including determining whether the sum of the first part and the second part of the volume of the buy order is superior or equal to a threshold volume. Moreover, the computer program product comprises a computer program means for executing the sell order and the buy order against each other if at least the selling conditions are fulfilled.

According to a further embodiment, a computer program product for processing orders in a security trading system is provided. The computer program product comprises a computer program means for receiving a buy order comprising an upper limit and a conditional upper limit. The upper limit and the conditional upper limit define a conditional buying price range in which the buy order can be executed under certain buying conditions. Further, the computer program product comprises a computer program means for receiving a sell order comprising a lower limit, a visible sell volume parameter and a hidden sell volume parameter. The visible sell volume parameter is specifying a first part of the volume of the sell order intended to be disclosed to all the customers of the security trading system. The hidden sell volume parameter is specifying a second part of the volume of the sell order intended not to be disclosed to all the customers of the security trading system. Furthermore, the computer program product comprises a computer program means for determining whether the buying conditions are fulfilled, including determining whether the sum of the first part and the second part of the volume of the sell order is superior or equal to a threshold volume. Moreover, the computer program product comprises a computer program means for executing the buy order and the sell order against each other if at least the buying conditions are fulfilled.

In still a further embodiment, a server computer system arranged for processing orders that is operable in a security trading system is provided. The server computer system comprises a means for receiving from at least one client computer system new sell orders comprising new lower limits and new conditional lower limits. The new lower limits and the new conditional lower limits define a conditional selling price range in which the sell order can be executed under certain new selling conditions. Further, the server computer system comprises a means for receiving from at least one client computer system a buy order comprising an upper limit, a visible buy volume parameter and a hidden buy volume parameter. The visible buy volume parameter is specifying a first part of the volume of the buy order intended to be disclosed to all the customers of the security trading system. The hidden buy volume parameter is specifying a second part of the volume of the buy order intended not to be disclosed to all the customers of the security trading system. Furthermore, the server computer system comprises a means for determining whether the new selling conditions are fulfilled, including determining whether the sum of the first part and the second part of the volume of the buy order is superior or equal to a new threshold volume. Moreover, the server computer system comprises a means for executing the sell order and the buy order against each other if at least the selling conditions are fulfilled.

In yet a further embodiment, a server computer system arranged for processing orders that is operable in a security trading system is provided. The server computer system comprises a means for receiving from at least one client computer system a buy order comprising an upper limit and a conditional upper limit. The upper limit and the conditional upper limit define a conditional buying price range in which the buy order can be executed under certain buying conditions. Further, the server computer system comprises a means for receiving from at least one client computer system a sell order comprising a lower limit, a visible sell volume parameter and a hidden sell volume parameter. The visible sell volume parameter is specifying a first part of the volume of the sell order intended to be disclosed to all the customers of the security trading system. The hidden sell volume parameter is specifying a second part of the volume of the sell order intended not to be disclosed to all the customers of the security trading system. Furthermore, the server computer system comprises a means for determining whether the buying conditions are fulfilled, including determining whether the sum of the first part and the second part of the volume of the sell order is superior or equal to a threshold volume. Moreover, the server computer system comprises a means for executing the buy order and the sell order against each other if at least the buying conditions are fulfilled.

In another embodiment, a client computer system arranged to generate orders that is operable in a security trading system is provided. The client computer system comprises a means for generating a sell order comprising a lower limit and a conditional lower limit. The lower limit and the conditional lower limit define a conditional selling price range in which the sell order can be executed under certain selling conditions. The sell order is adapted to be executed against a buy order comprising an upper limit, a visible buy volume parameter specifying a first part of the volume of the buy order intended to be disclosed to all the customers of the security trading system, and a hidden buy volume parameter specifying a second part of the volume of the buy order intended not to be disclosed to all the customers of the security trading system, if at least the selling conditions are fulfilled. The selling conditions comprise a condition that the sum of the first part and the second part of the volume of the buy order is superior or equal to a threshold volume.

In still another embodiment, a client computer system arranged to generate orders that is operable in a security trading system is provided. The client computer system comprises a means for generating a buy order comprising an upper limit and a conditional upper limit. The upper limit and the conditional upper limit define a conditional buying price range in which the buy order can be executed under certain buying conditions. The buy order is adapted to be executed against a sell order comprising a lower limit, a visible sell volume parameter specifying a first part of the volume of the sell order intended to be disclosed to all the customers of the security trading system, and a hidden sell volume parameter specifying a second part of the volume of the sell order intended not to be disclosed to all the customers of the security trading system, if at least the buying conditions are fulfilled. The buying conditions comprise a condition that the sum of the first part and the second part of the volume of the sell order is superior or equal to a threshold volume.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 2:
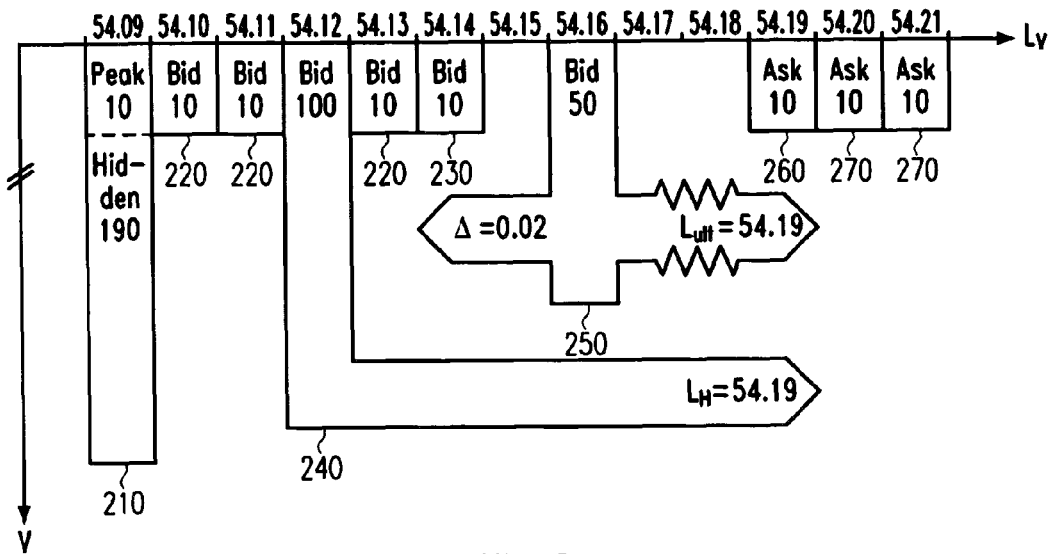
FIG. 2 illustrates orders within an order book that can be matched with each other according to prior art.
Figure 3:
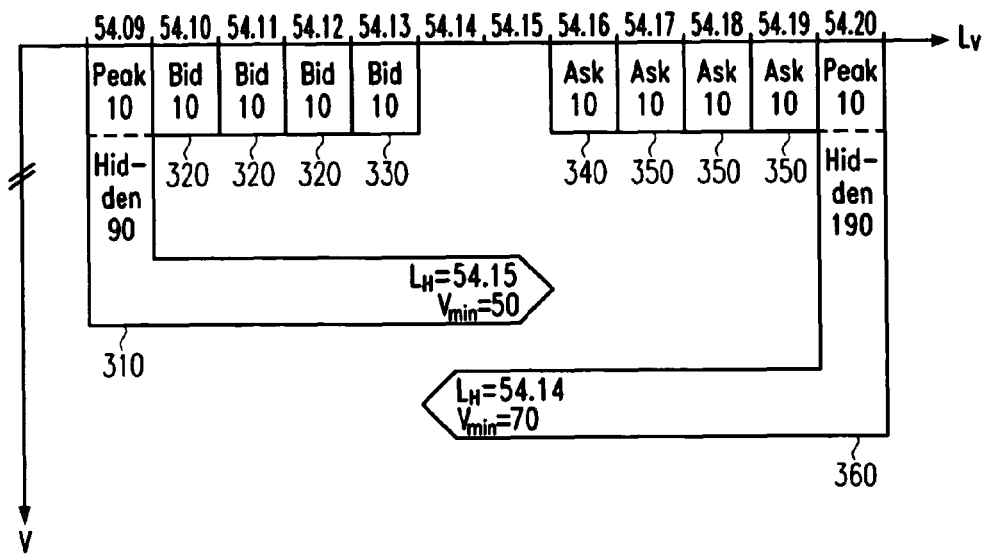
FIG. 3 illustrates orders within an order book that can be matched with each other according to an embodiment.

Referring now to FIG. 3, an example of buy orders 310 to 330 and ask orders 340 to 360 within an order book is illustrated that can be matched against each other according to an embodiment. In comparison to the prior art depicted in FIG. 2, the order book of the present embodiment comprises a new type of order: the volume orders 310 and 360. Sell (buy) volume orders 360 (310) may include a peak volume, a hidden volume, a lower limit (upper limit), a conditional lower limit (conditional upper limit), and a threshold volume, i.e., a minimum execution size $V_{min}$. In the present embodiment, the lower limit (upper limit) is disclosed to all the customers of the security trading system, while the conditional lower limit (conditional upper limit) is not disclosed to all the customers. Thus, in the following, the lower limit (upper limit) will be referred to as the visible limit $L_V$, and the conditional lower limit (conditional upper limit) will be referred to as the hidden limit $L_H$.

Volume order functionality may comprise the iceberg order functionality described above with reference to FIG. 2, extended with the hidden limit and the minimum execution size which may be set to zero. Standard minimum execution sizes may be defined by the provider of the security trading system. This may prevent locked order book situations that may occur when minimum execution sizes can be defined individually for each order.

Only the visible limit and the peak size may be revealed to the market while the hidden limit, the hidden size, and the minimum execution size may remain undisclosed to the market. According to the embodiment, the hidden limit defines with the visible limit a conditional price range in which the order can be executed under certain conditions. In another embodiment, a volume order may include a plurality of hidden limits defining, together with the visible limit, plural conditional price ranges in which the volume order can be executed under different conditions.

The hidden limit of the volume order 310, 360 may be higher, lower, or equal to its visible limit. It may reach ahead the visible limit on the own market side, into the inside market or into the opposite market side's depth. If, for a sell (buy) volume order 360 (310), the hidden limit is inferior (superior) to the visible limit, the conditional price range may correspond to the price interval spanned by the hidden limit and the visible limit. Otherwise, the conditional price range may extend from the visible limit to infinity (from zero to the visible limit). In other embodiments, other definitions of the conditional price range may be applied.

The minimum execution size may specify a minimum threshold size for execution of the volume order 310, 360 under certain conditions. In the present embodiment, the minimum execution size specifies a minimum threshold size for execution of the volume order 310, 360 on basis of the hidden limit, ahead of the visible limit.

According to the depicted embodiment, the buy volume order 310 can be matched against the sell volume order 360. This would not have been possible according to the conventional matching techniques described above with reference to FIG. 2. According to prior art, the hidden limit of a buy order could only be matched against visible sell limits and vice versa. In the example depicted in FIG. 3, such a procedure would result in that none of the volume orders 310 and 360 could be executed since the order book does not contain any visible sell (buy) limits within the conditional range of the buy (sell) volume order 310 (360).

However, according to the embodiment, the conditional ranges of the volume orders 310 and 360 overlap. Thus, the buy volume order 310 may be executed against the sell volume order 360 if the minimum execution size of the buy volume order 310 can be executed. In turn, the sell volume order 360 may be executed against the buy volume order 310 if the minimum execution size of the sell volume order 360 can be executed. For hidden limit matching, the full order size, i.e., the sum of the visible peak size and the hidden size, is available. In the depicted example, the full size of the sell volume order 360 is larger than the minimum execution size of the buy volume order 310 and vice versa. Thus, according to the embodiment, the buy volume order 310 and the sell volume order 360 can be executed against each other: the buy volume order 310 may be executed completely against 100 shares of the sell volume order 360.

According to the embodiment shown in FIG. 3 which illustrates the interaction of two volume orders 310, 360 within the inside market, price discovery and matching take place within the inside market when hidden limits overlap and the minimum execution sizes are satisfied. The overlapping parts of the conditional price ranges of the buy volume order 310 and the sell volume order 360 is also referred to as the matching range. In the depicted example, the matching range extends from 54.14 to 54.15. The two volume orders 310, 360 may execute at a price within their overlapping hidden limits, e.g., half of the hidden limits' overlap according to midpoint price discovery. Alternatively, the two volume orders 310, 360 may be executed at a price at the matching range borders, i.e., at 54.15 (54.14) if the buy (sell) volume order 310 (360) has entered the order book first. Other methods for price determination may be applied.

Figure 4:
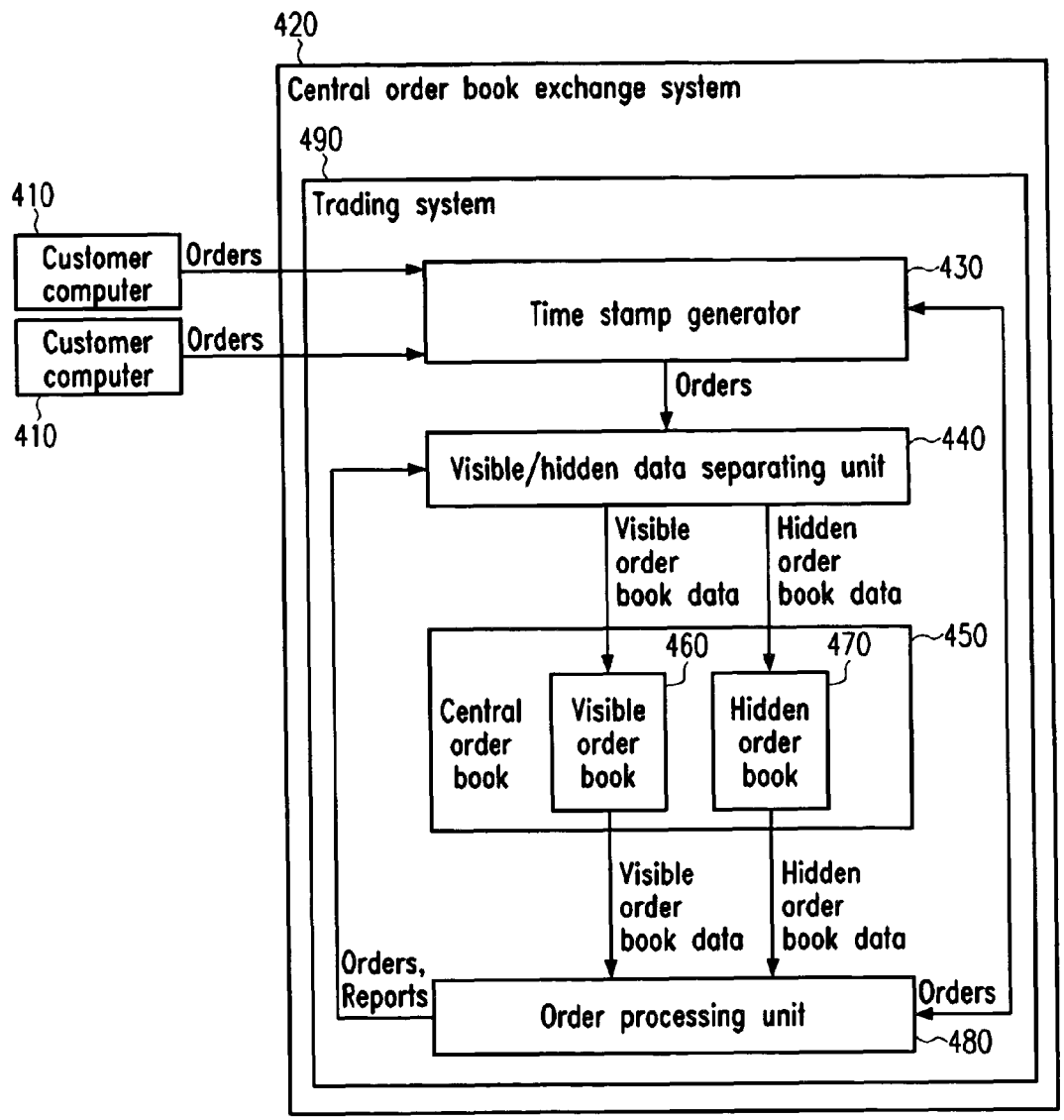
FIG. 4 is a block diagram illustrating the components of a computer system for processing orders according to an embodiment.

In FIG. 4, a computer system for processing orders in a security trading system according to an embodiment is illustrated. The computer system may provide the required functionalities for volume order processing.

Figure 1:
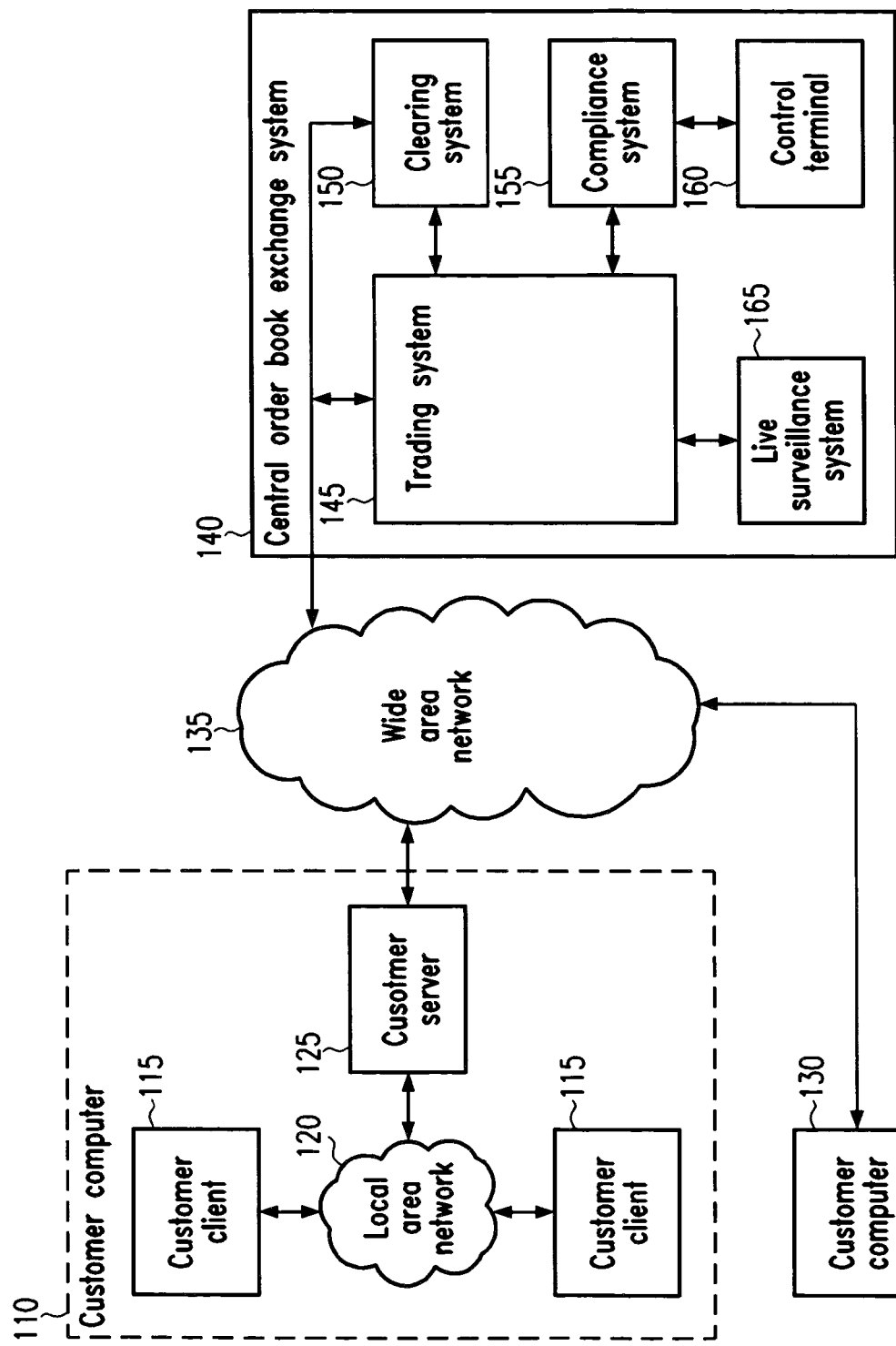
FIG. 1 is a block diagram illustrating a computer system for processing orders according to prior art.

According to the illustrated embodiment, the computer system comprises a central order book exchange system 420 for storing, matching and executing orders as well as for reporting purposes. The central order book exchange system 420 may comprise a trading system 490 connected to customer computers 410 for receiving orders from customers. For instance, the trading system 490 may be coupled to the customer computers 410 through a WAN or any other type of computer network. The customer computers 410 may comprise stand-alone computer systems or have a distributed system architecture. The central order book exchange system 420 may further comprise a clearing system, a compliance system, a control terminal and/or a live surveillance system that have been described above with respect to FIG. 1. For reasons of clarity, those components as well as the network connecting the trading system 490 to the customer computers 410, and the details of the customer computer architecture are not depicted in FIG. 4.

Incoming orders may first enter a time stamp generator 430 for determining and defining the time of order arrival. The time stamp generator 430 may create a time stamp for each incoming order and associate the time stamp with the order. The orders may comprise parameters, e.g., the time stamp, a visible limit, and a visible volume, and hidden parameters, e.g., a hidden limit, a hidden volume, or a minimum execution size. The hidden parameters of an order may be invisible to the customers using the computer system except the originator of the order. To allow this, at least the hidden parameters may be associated with the owner of the corresponding order, e.g., by means of an identification item identifying the originator attached to the hidden parameters. The orders may be sent from the time stamp generator 430 to a visible/hidden data separating unit 440. The visible/hidden data separating unit 440 may recognize which data are visible or hidden and associate the hidden parameters of an order with the visible parameters of the same order prior to sending the data to a central order book 450. For this purpose, identifiers may be attached to the visible and hidden parameters of the respective order.

According to the embodiment, the central order book 450 may comprise a visible order book 460 whose content may be visible to all the customers using the computer system. Further, the central order book 450 may comprise a hidden order book 470 whose content may be invisible to the customers except the originators of the corresponding orders. Visible or hidden data may be stored in the visible order book 460 or the hidden order book 470, respectively.

For matching incoming orders with the orders already present in the central order book 450, an order processing unit 480 may receive the incoming orders from the time stamp generator 430. Further, the order processing unit 480 may obtain visible order book data and/or hidden order book data from the visible order book 460 or the hidden order book 470 to determine the current order book situation. Thus, the central order book 450 forms a reference market in the present embodiment. However, in another embodiment, the reference market could be any other entity that provides reference prices instead of the central order book 450.

Upon having determined whether an incoming order can be executed against the orders in the central order book 450 and having executed the order accordingly, the order processing unit 480 may send an execution report to the visible/hidden data separating unit 440. Further, the order processing unit 480 may re-enter residual orders to the central order book 450 by transmitting the residual orders to the time stamp generator 430 or the visible/hidden data separating unit 440.

It may be understood by those skilled in the art, that various distributed architectures may be applied to the computer system illustrated in FIG. 4. For instance, the customer computers 410 may be client computers interacting with the central order book exchange system 420 as server. In other embodiments, the customer computers 410 and/or the central order book exchange system 420 themselves may be implemented as distributed client-server systems or the entire computer system may be realized as an integrated stand-alone system.

In further embodiments, the order processing unit 480 may be comprised within the central order book 450. Accordingly, the visible/hidden data separating unit 440 may be included in the central order book 450. In further embodiments, the visible order book data and the hidden order book data may be comprised all together in the central order book 450 instead of the separate visible order book 460 and hidden order book 470. The central order book 450 may filter the data before revealing them to the customers so that the hidden order book data may remain undisclosed. According to the present embodiment, the time stamp generator 430 is included in the trading system 490. In other embodiments, the time stamp generator 430 may be comprised, e.g., within the central order book 450 or the order processing unit 480.

Figure 5:
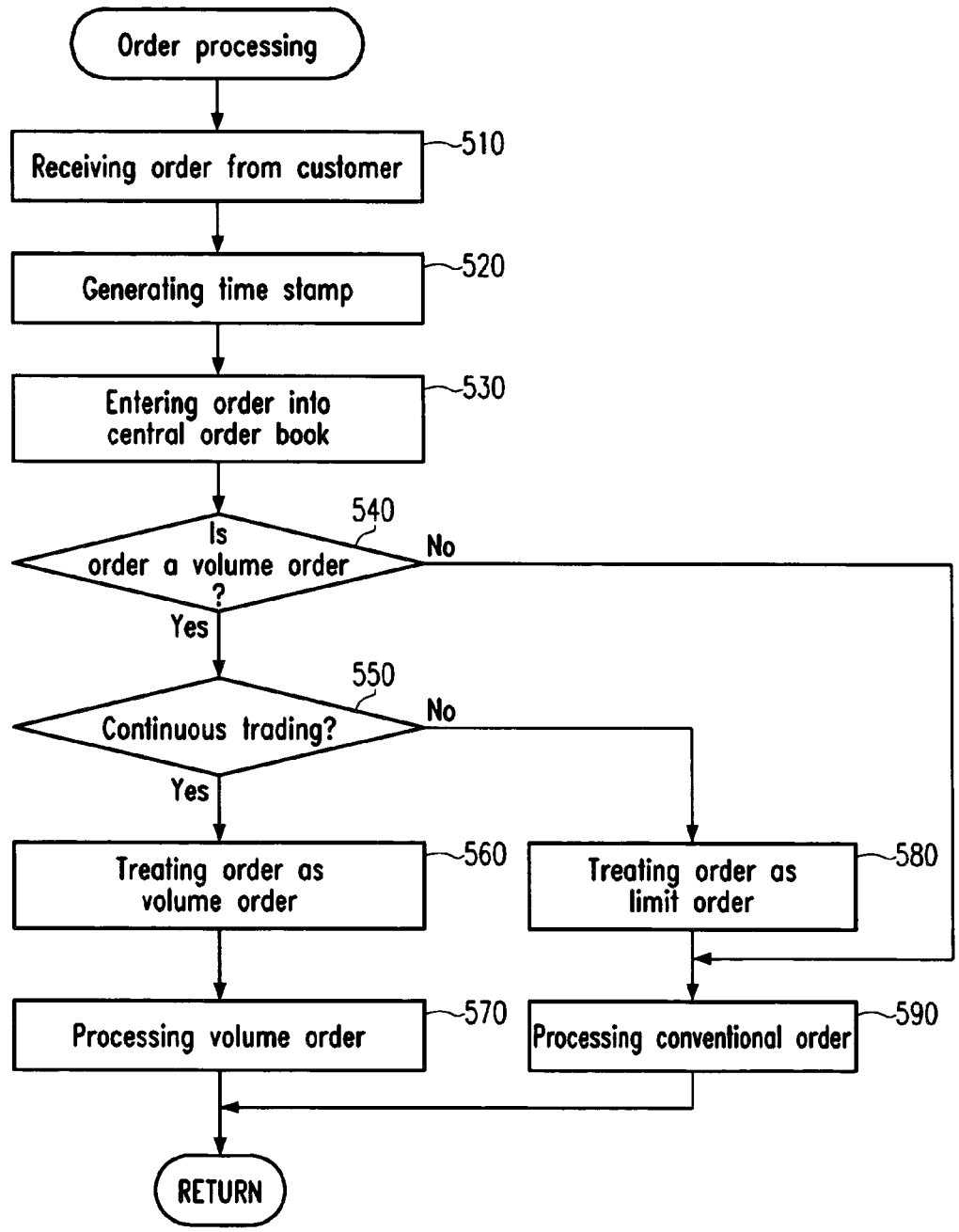
FIG. 5 is a flow diagram illustrating order processing according to an embodiment.

Referring now to FIG. 5, the main order processing according to an embodiment is illustrated. In step 510, an order may be received from a customer, e.g., the central order book exchange system 420 may receive the order from a customer computer 410. In step 520, a time stamp may be generated for the received order. After generation of the time stamp data item, this data may be associated with the respective order. If the order is in the form of electronic data, the time stamp data item may be attached to the order data. Alternatively, the time stamp may be stored in a volatile or non-volatile memory within the central order book 450, e.g., as a visible order parameter in the visible order book 460, together with an identifier indicating the respective order.

Once the time stamp has been generated and associated with the order, the order may be entered into the central order book 450 in step 530. This may include associating the hidden parameters with the visible parameters of the received order by the visible/hidden data separating unit 440, sending the visible parameters to the visible order book 460 and sending the hidden parameters to the hidden order book 470. Additionally, the order may be sent from the time stamp generator 430 to the order processing unit 480. Also the corresponding time stamp may be sent to the order processing unit 480.

In step 540, it may be determined whether the received order is a volume order. According to the embodiment, this includes determining whether the received order comprises a hidden limit. Further, this may comprise determining whether the received order contains a minimum execution size. Alternatively, an identifier could be associated with the order allowing for identifying the type of order, thus allowing determining whether the order is a volume order. If the received order is not a volume order, i.e., the received order is a conventional order, the order processing scheme may proceed with processing the conventional order in step 590. This may include determining whether the order book 450 is containing an opposite volume order and, if so, whether the conventional order is executable against the opposite volume order.

Otherwise, it may be determined in step 550 if the actual trading phase is a continuous trading phase 1320 not interrupted by an auction 1330. If the actual trading phase is not a running continuous trading phase it may be determined in step 580 that the order is to be treated as a limit order, i.e., both the visible volume and the hidden volume are to be treated equally like visible volume and the hidden limit and the minimum execution size are to be disregarded. Thus, volume orders contribute with their overall size in auctions 1330. The order, now corresponding to a conventional limit order, may be processed in step 590. If the order has not been completely executed during an auction 1330 and then a continuous trading phase 1320 is entered the order may again be treated as a volume order, i.e., its visible and hidden limits, visible and hidden size and minimum execution size may be considered. In other embodiments, a volume order may not be treated as a limit order but, e.g., held until a continuous trading phase 1320 is entered or an auction 1330 is completed. If the actual trading phase is a continuous trading phase 1320 and not an auction phase 1330 it may be determined in step 560 that the order is to be treated as a volume order which may be processed in step 570.

It may be apparent to those of ordinary skill in the art that the sequence of steps shown in FIG. 5 has been chosen for illustration purposes only and is not to be understood as limiting the invention. For instance, steps 520 to 550 may be performed in any different order. According to the present embodiment, the steps 570 and 590 of processing the volume/conventional order are performed by the order processing unit 480. In other embodiments, the volume order processing step 570 and/or the conventional order processing step 590 may be performed by different, separate order processing units or by the central order book 450.

Figure 6:
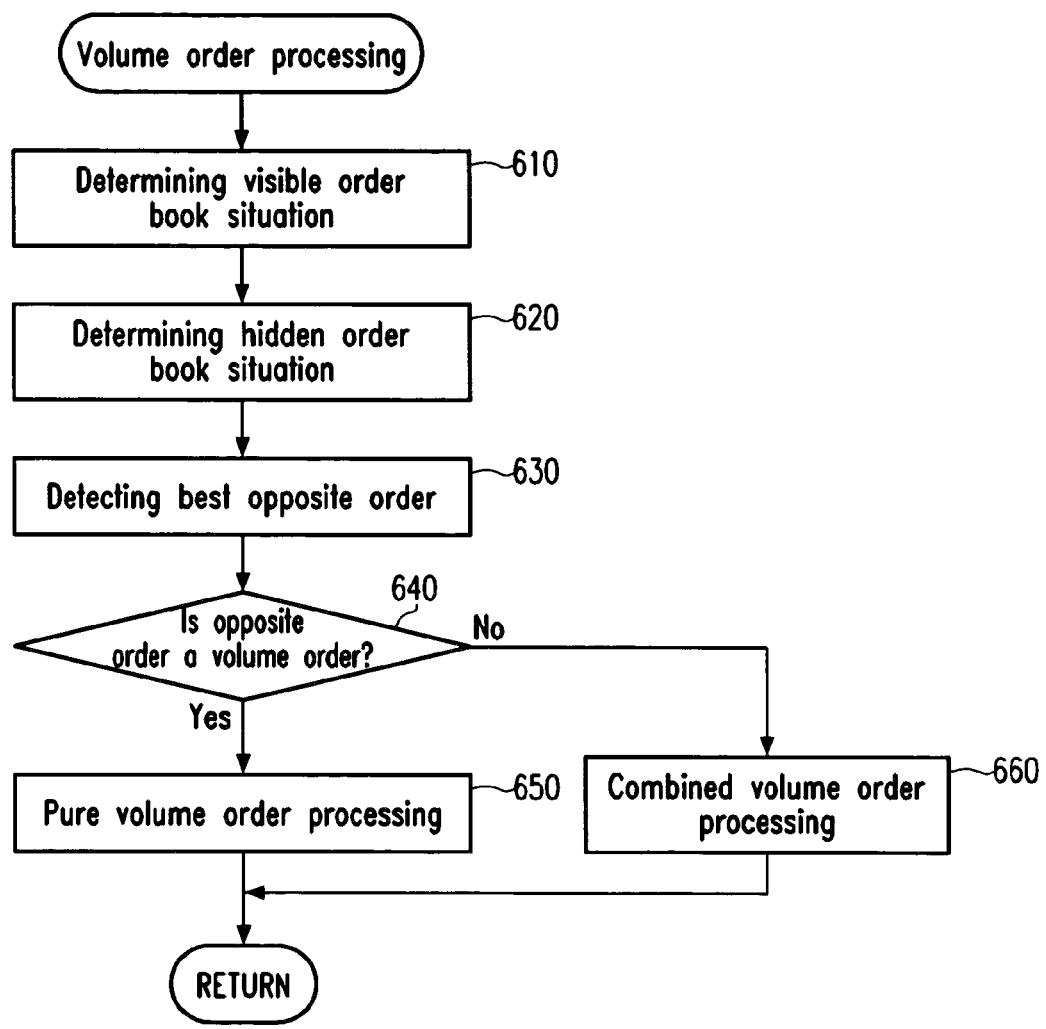
FIG. 6 is a flow diagram illustrating volume order processing within the order processing of FIG. 5 according to an embodiment.

In FIG. 6, the volume order processing step 570 is shown in more detail according to an embodiment. In step 610, the visible order book situation and in step 620 the hidden order book situation may be determined. For this purpose, the order processing unit 480 may receive from the visible (hidden) order book 460 (470) visible (hidden) order book data indicating the current visible (hidden) order book situation. This may be done by previously sending a request from the order processing unit 480 to the central order book 450 whereupon the central order book 450 may send back the respective data in response to the request. Alternatively, the central order book 450 may be arranged for continuously sending visible (hidden) order book data to the order processing unit 480 and updating this data whenever the visible (hidden) order book situation changes in order to reduce communication load. In this case, there may be no need for the order processing unit 480 to send a request to the central order book 450 in step 610 (620) since all data is already present. In other embodiments, steps 610 and 620 may be accomplished following the inverse order.

After the order processing unit 480 has received the order with the associated time stamp as well as the visible and hidden order book data necessary to determine the current visible and hidden order book situation, the order processing unit 480 may proceed in step 630 with detecting a best opposite order. If the received order, hereinafter referred to as the actually processed order, is a buy order, the best opposite order may be detected among the sell orders within the central order book 450 and vice versa. The detecting step 630 may comprise determining which of the opposite orders comprises the best limit, i.e., the lowest limit if the opposite orders are sell orders or the highest limit if the opposite orders are new buy orders. If the actually processed order is positioned on top of the order book and the opposite side of the order book comprises a market order, i.e., an unlimited order, the opposite market order may be treated as a limit order having a visible limit corresponding to the visible limit of the actually processed order.

According to the embodiment, both visible and hidden limits are considered for determining the best limit. If a visible limit and a hidden limit are equal to each other and better than all the other limits of the opposite orders, the orders comprising this visible limit may be preferred for determining the best opposite order. Further, if more than one opposite order comprises the best limit, the opposite order with the earliest time stamp may be selected as the best opposite order, in accordance with price-time priority. However, in other embodiments, different criteria may be applied for detecting the best opposite order.

Once the best opposite order, hereinafter also referred to as the opposite order, has been detected in step 630, it may be determined in step 640 if the detected opposite order is a volume order. This may be done on the basis of the same criteria as used in step 540, described above with reference to FIG. 5. If the opposite order is a volume order, the volume order processing scheme may proceed with pure volume order processing in step 650. Otherwise, the combined volume order processing may be performed in step 660.

Figure 7:
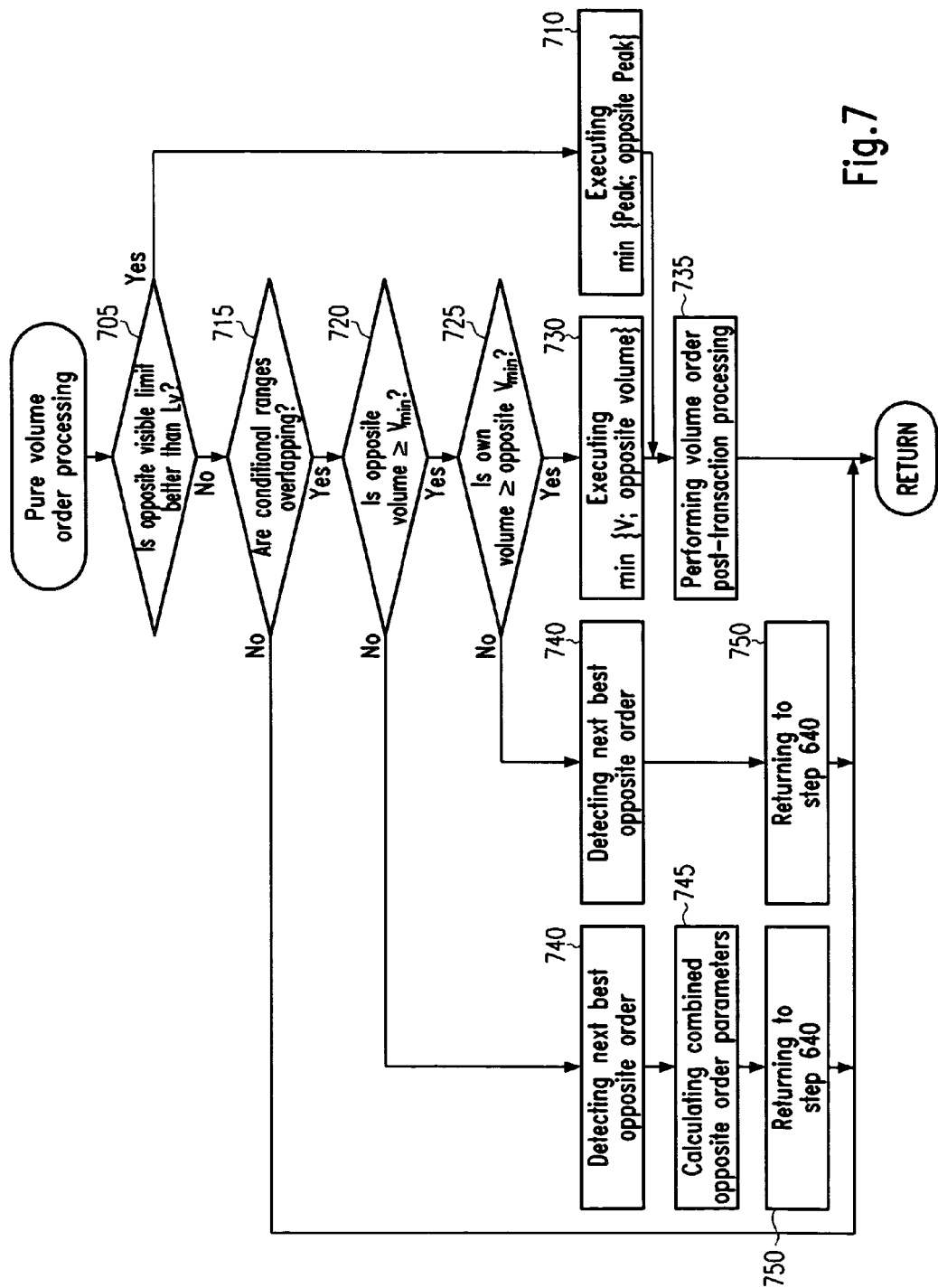
FIG. 7 is a flow diagram illustrating pure volume order processing within the volume order processing of FIG. 6 according to an embodiment.

The pure volume order processing 650 is illustrated in more detail according to an embodiment in FIG. 7. In step 705, it may be determined whether the visible limit of the opposite order is better than the visible limit of the actually processed order. This may comprise determining whether the visible limit of an opposite buy (sell) order is higher (lower) than the visible limit of an actually processed sell (buy) order. In case the visible limit of the opposite order is better than the visible limit of the actually processed order, the system may proceed to step 710 where the actually processed order and the opposite order may be executed against each other. According to the embodiment, the executed volume corresponds to the peak volume of the actually processed order if the peak volume of the actually processed order is inferior or equal to the peak volume of the opposite order and, if this is not the case, to the peak volume of the opposite order. Once the orders have been executed against each other, the volume order post-transaction processing may be performed in step 735 which will be described below with reference to FIG. 9.

If the visible limit of the opposite order is not better than or equal to the visible limit of the actually processed order, it may be determined in step 715 whether the conditional ranges of the actually processed order and the opposite order overlap. If the conditional ranges are not overlapping, the actually processed order may not be executed and the order processing may be complete at this point. However, according to the embodiment, the actually processed order remains in the central order book 450 and can still be matched when later received orders are processed.

If the determining step 715 yields that the conditional ranges of the actually processed order and the opposite order overlap, it may be determined in step 720 whether the volume of the opposite order is superior or equal to the minimum execution size of the actually processed order. The volume of the opposite order considered in the determining step 720 may comprise the overall volume of the opposite order, i.e., the sum of the visible volume and the hidden volume of the opposite order. In step 725 it may be accordingly determined whether the volume of the actually processed order is superior or equal to the minimum execution size of the opposite order taking into account the overall volume, i.e., the sum of the visible volume and the hidden volume of the actually processed order.

If both the volume of the opposite order is superior or equal to the minimum execution size of the actually processed order and the volume of the actually processed order is superior or equal to the minimum execution size of the opposite order, the pure volume order processing scheme may proceed to step 730 for executing the actually processed order and the opposite order against each other. The volume executed in step 730 may correspond to the overall volume of the actually processed order if the overall volume of the actually processed order is inferior or equal to the overall volume of the opposite order and otherwise to the overall volume of the opposite order. Once the execution step 730 is completed, volume order post-transaction processing may be performed in step 735. The volume order post-transaction processing will be described in more detail below with respect to FIG. 9.

If at least the volume of the opposite order is inferior to the minimum execution size of the actually processed order or the volume of the actually processed order is inferior to the minimum execution size of the opposite order, the pure volume order processing scheme may proceed to step 740. According to the illustrated embodiment, the next best opposite order is detected in step 740. This may comprise repeating steps 610 and 620 of determining the visible and hidden order book situation described above with respect to FIG. 6. Alternatively, the order processing unit 480 could store the visible and hidden order book data received in steps 610 and 620 prior to detecting the best opposite order and detect the next best opposite order in step 740 on the basis of the stored data without the need for re-transmitting the respective data from the central order book 450. According to the embodiment, the detection of the next best opposite order in step 740 is based on the same criteria as the detection of the best opposite order in step 630 described above with reference to FIG. 6, whereby the already detected best opposite order is disregarded.

Once the next best opposite order has been detected in step 740, combined opposite order parameters of the best opposite order and the next best opposite order may be calculated in step 745 if it has determined in step 720 that the volume of the opposite order is inferior to the minimum execution size of the actually processed order. If this is not the case, but the volume of the actually processed order is inferior to the minimum execution size of the opposite order according to the determination in step 725, step 745 of calculating combined opposite order parameters may be skipped.

The combined opposite order parameters may be used for ensuring that in the further processing the sum of the visible (hidden) volumes of the best opposite order and the next best opposite order is considered, and all the conditions for executing the best opposite order and for executing the next best opposite order are checked. According to the embodiment, an actually processed volume order is executed against a plurality of best and next best opposite orders only on condition that each of the best and next best limits is better than or equal to the hidden limit of the actually processed volume order, i.e., each of the opposite orders reaches a price corresponding to the specified hidden limit.

Upon calculation of the combined opposite order parameters in step 745 (or upon having detected the next best opposite order in step 740, if the calculation step 745 is skipped), the pure volume order processing scheme may proceed to step 750 for returning to step 640. In the following processing, the combined opposite order parameters may be considered instead of the parameters of the best opposite order only.

It will be appreciated by those of ordinary skill in the art that schemes other than that depicted in FIG. 7 are also applicable within the invention. In particular, the order in which the queries 705 and 715 to 725 are performed may be different in other embodiments. Further, the order execution steps 710 and/or 730 may be performed by a separate order executing unit in other embodiments. Such an order executing unit may be comprised within the central order book exchange system 420, the trading system 490, the central order book 450 or the order processing unit 480.

Figure 8:
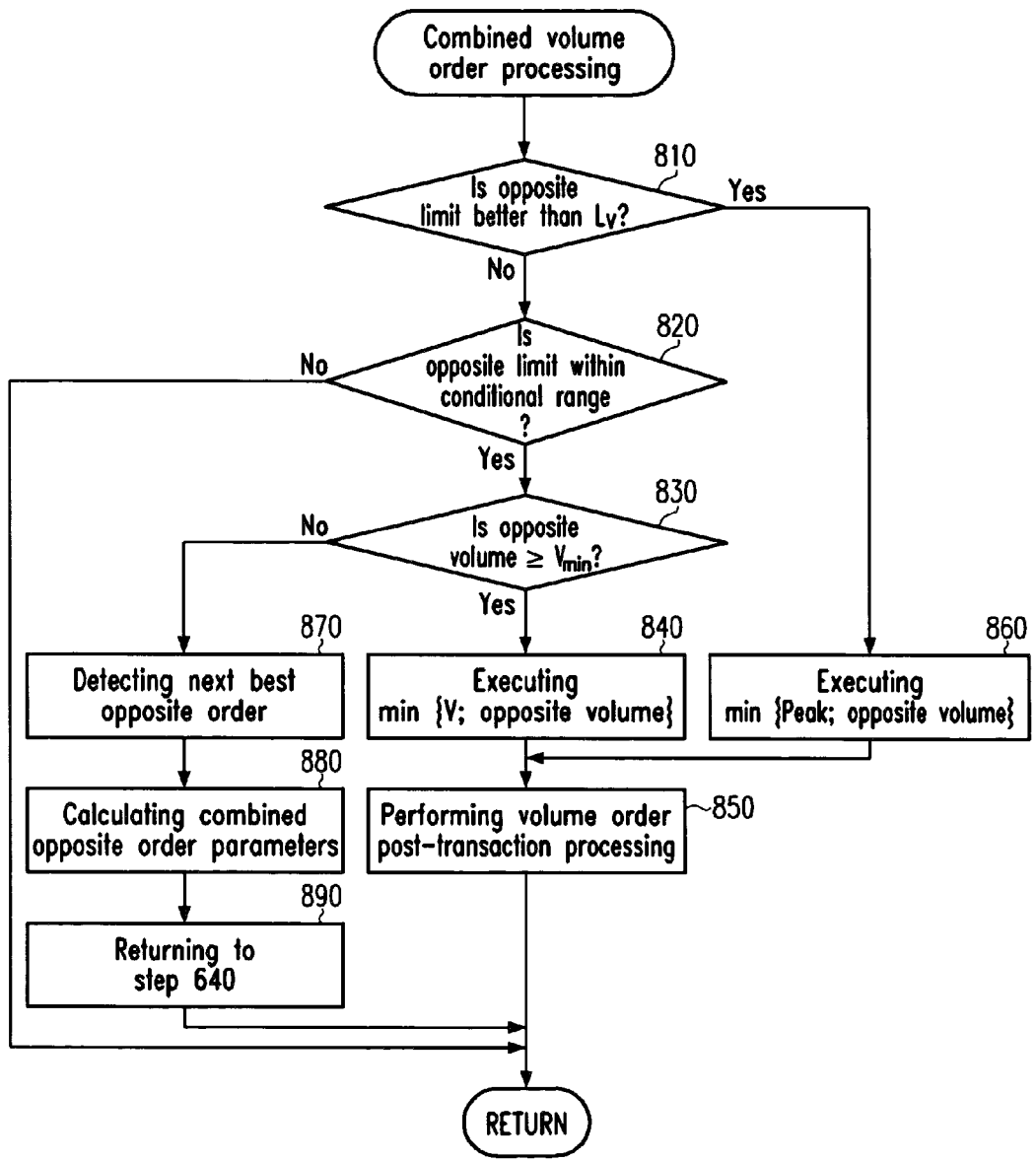
FIG. 8 is a flow diagram illustrating combined volume order processing within the volume order processing of FIG. 6 according to an embodiment.

Turning now to FIG. 8, substeps of the combined volume order processing step 660 according to an embodiment are shown. In step 810, it may be determined whether the limit of the conventional opposite order is better than or equal to the visible limit of the actually processed volume order, i.e., whether the limit of an opposite buy (sell) order is higher (lower) than or equal to the visible limit of an actually processed sell (buy) volume order.

If this is the case, the actually processed order may be executed against the opposite order in step 860. According to an embodiment, the executed volume corresponds to the peak volume of the actually processed order if the peak volume of the actually processed order is inferior or equal to the volume of the opposite order, or otherwise to the volume of the opposite order. If the opposite order is an iceberg order, only the peak volume of the opposite iceberg order may be considered when determining the volume to be executed in step 860.

In the present embodiment, the order execution step 860, and accordingly step 840, are achieved by the order processing unit 480. In other embodiments, steps 840 and/or 860 may be performed by a separate order executing unit, according to steps 710 and/or 730 described above. Once the actually processed order has been executed against the opposite order in step 860, the combined volume order processing scheme may proceed with step 850 for performing volume order post-transaction processing described in more detail below with respect to FIG. 9.

In case the limit of the opposite order is not better than or equal to the visible limit of the actually processed order, it may be determined in step 820 whether the limit of the opposite order is within the conditional range of the actually processed order. This may comprise determining whether the limit of an opposite buy (sell) order is inferior (superior) to the visible limit and superior or equal (inferior or equal) to the hidden limit of an actually processed sell (buy) order.

If the limit of the opposite order is not within the conditional range of the actually processed order, the actually processed order may not be executed against the opposite order. According to the embodiment, the actually processed order remains in the central order book 450 and may be matched passively during the processing of later received orders.

If the limit of the opposite order is within the conditional range of the actually processed order, it may be determined in step 830 whether the volume of the opposite order is superior or equal to the minimum execution size of the actually processed order. If the opposite order is an iceberg order, only the peak size of the iceberg order may be considered in step 830. If the opposite volume is superior or equal to the minimum execution size of the actually processed order, i.e., allows an execution of at least the minimum execution size, the actually processed order may be executed against the opposite order in step 840. If the overall volume, i.e., the sum of the visible and the hidden volume of the actually processed order is inferior or equal to the volume of the opposite order, the entire overall volume of the actually processed order may be executed in step 840. Otherwise, the volume of the opposite order may be executed in step 840. For determining the volume to be executed in step 840, only the peak size of the opposite order may be considered if the opposite order is an iceberg order. According to the illustrated embodiment, the combined volume order processing scheme proceeds with step 850 for performing volume order post-transaction processing once the execution step 840 is completed. The volume order post-transaction processing step 850 will be described in more detail with respect to FIG. 9.

If the determining step 830 yields that the volume of the opposite order is inferior to the minimum execution size of the actually processed order, a next best opposite order may be detected in step 870. If the so far regarded best opposite order is an iceberg order having a hidden volume left, the next best opposite order may correspond to the next peak of the iceberg order. Otherwise, the next best opposite order may be detected in step 870 based on the same criteria as the best opposite order has been detected in step 630, whereby the best opposite order is disregarded.

Upon having detected the next best opposite order in step 870, the combined volume order processing scheme may proceed with step 880 for calculating combined opposite order parameters. This may be achieved in the same way as combined opposite parameters are calculated in step 745 during the pure volume order processing described with respect to FIG. 7. In step 890, the volume order processing scheme may return to step 640 for determining whether the combined opposite order parameters correspond to the parameters of a volume order and proceed according to the process depicted in FIG. 6.

Figure 9:
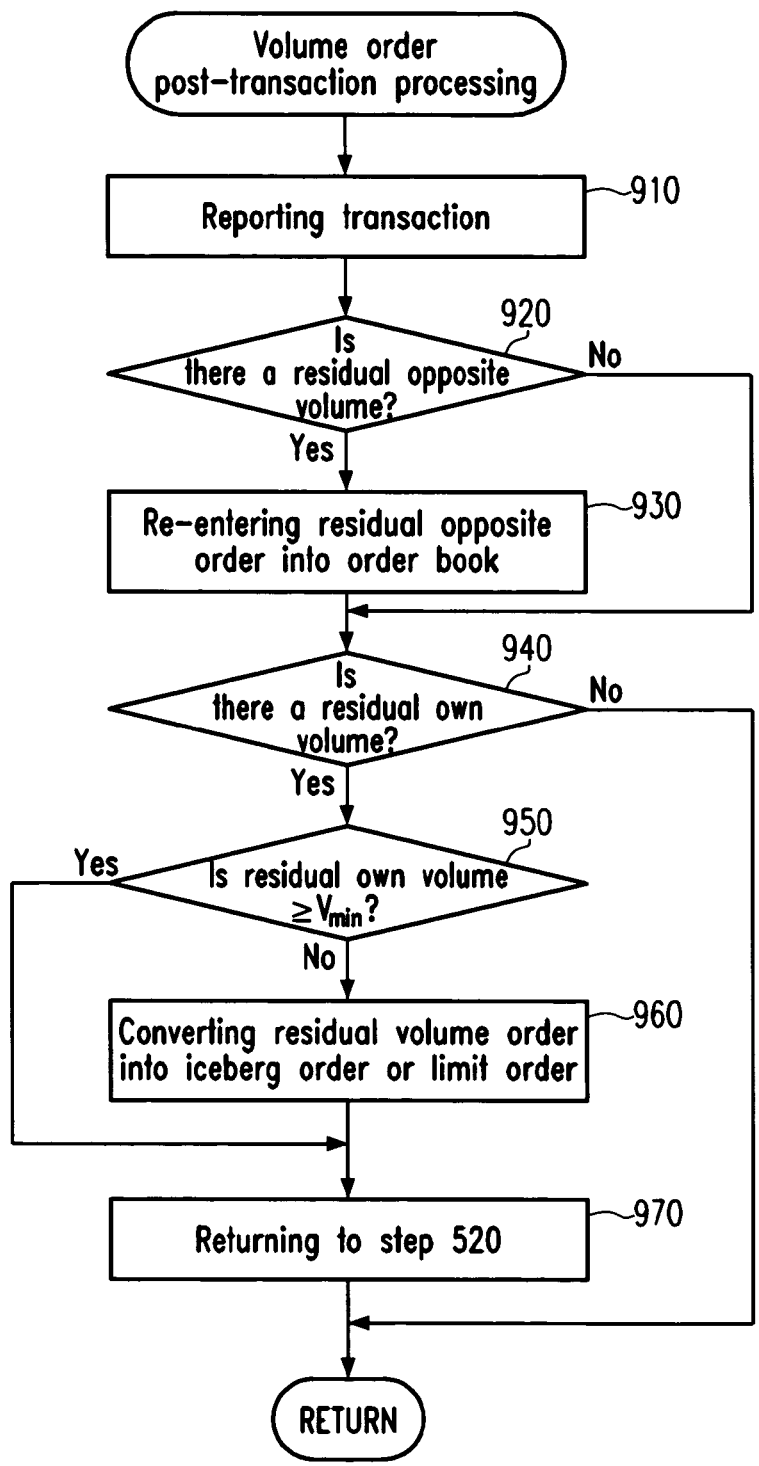
FIG. 9 is a flow diagram illustrating volume order post-transaction processing within the pure volume order processing of FIG. 7 and the combined volume order processing of FIG. 8 according to an embodiment.

In FIG. 9, the volume order post-transaction processing according to an embodiment is depicted. The volume order post-transaction processing may be performed in step 735 of the pure volume order processing illustrated in FIG. 7 and step 850 of the combined volume order processing depicted in FIG. 8.

In step 910, the order processing unit 480 may send a report of the executed transaction to the visible/hidden data separating unit 440 for publication purposes. In other embodiments, the execution steps 710, 730, 840 or 860 may be performed by a unit different from the order processing unit 480 and the corresponding report may be generated and sent by the respective unit. In further embodiments, the report may be sent directly to the central order book 450, the visible order book 460, and/or the hidden order book 470.

In step 920, it may be determined whether the opposite order contains a residual volume. If this is the case, the residual opposite order may be re-entered into the order book in step 930. The volume order post-transaction processing scheme may then proceed with step 940. If the entire volume of the opposite order has been executed, step 930 may be skipped and the volume order post-transaction processing scheme may proceed directly with step 940.

If the opposite order is a volume order and the residual volume of the opposite order is inferior to the minimum execution size of the opposite volume order, the opposite volume order may be converted to an iceberg order before being re-entered into the order book in step 930. If the opposite order is an iceberg order and the peak size of the opposite iceberg order has been completely executed, a new time stamp may be generated for the opposite iceberg order before re-entering the residual opposite iceberg order into the order book in step 930.

According to an embodiment, it is determined in step 940 whether the actually processed order comprises a residual volume. If the actually processed order does not contain a residual volume, i.e., has completely been executed, the order processing may be complete at this point. Otherwise, it may be determined in step 950 whether the residual volume of the actually processed order is superior or equal to the minimum execution size of the actually processed order. If so, the volume order post-transaction processing scheme may proceed with step 970 for returning to step 520 of the order processing depicted in FIG. 5 and performing the following order processing steps for the residual part of the actually processed order. Otherwise, the residual actually processed volume order may be converted into an iceberg order in step 960. According to the embodiment, this comprises deleting the hidden limit and the minimum execution size from the parameters of the actually processed order. In other embodiments, the residual actually processed order may be converted into a conventional limit order, i.e., for further processing of the order, the hidden limit and the minimum execution size may be deleted and both the residual visible volume and the residual hidden volume, if any, may be regarded as visible.

Once the residual actually processed volume order has been converted in step 960, the volume order post-transaction processing scheme may also proceed to step 970 for re-entering the resulting iceberg order or limit order to the order processing at step 520. It may be appreciated by those skilled in the art that the sequence of the steps depicted in FIG. 9 may not be construed as limiting to the present invention. In particular, step 910, the block of steps 920 and 930, and the block of steps 940 to 970 may be performed in a different order.

Figure 10:
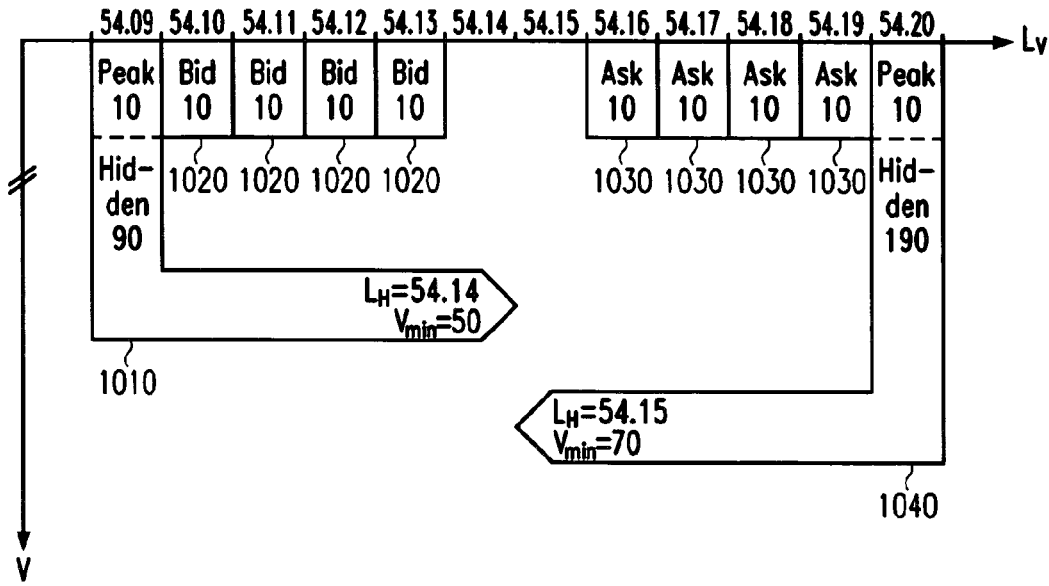
FIG. 10 illustrates an example of an order book situation according to an embodiment.

Referring now to FIG. 10, a further example of a set of orders within the order book according to an embodiment is shown. Assuming that the buy volume order 1010 (the sell volume order 1040) represents the actually processed order, the detection step 630 of the embodiment illustrated in FIG. 6 may reveal the sell volume order 1040 (the buy volume order 1010) as the best opposite order. Next, it may be determined in step 640 that the best opposite order is a volume order. In the following, it may be determined that the visible limit of the opposite order 1040 (1010) is not better than the visible limit of the actually processed order 1010 (1040) in step 705 and that the conditional ranges of the actually processed order 1010 (1040) and the opposite order 1040 (1010) do not overlap in step 715 of the pure volume order processing 650. According to the illustrated embodiment, the buy volume order 1010 and the sell volume order 1040 may not be executed against each other but remain in the central order book 450 patiently waiting to be matched. Thus, volume orders in such a constellation may have no effect on order book trading. However, the executability of a waiting volume order may be verified each time the order book situation on the opposite side of the order book 450 changes.

Figure 11:
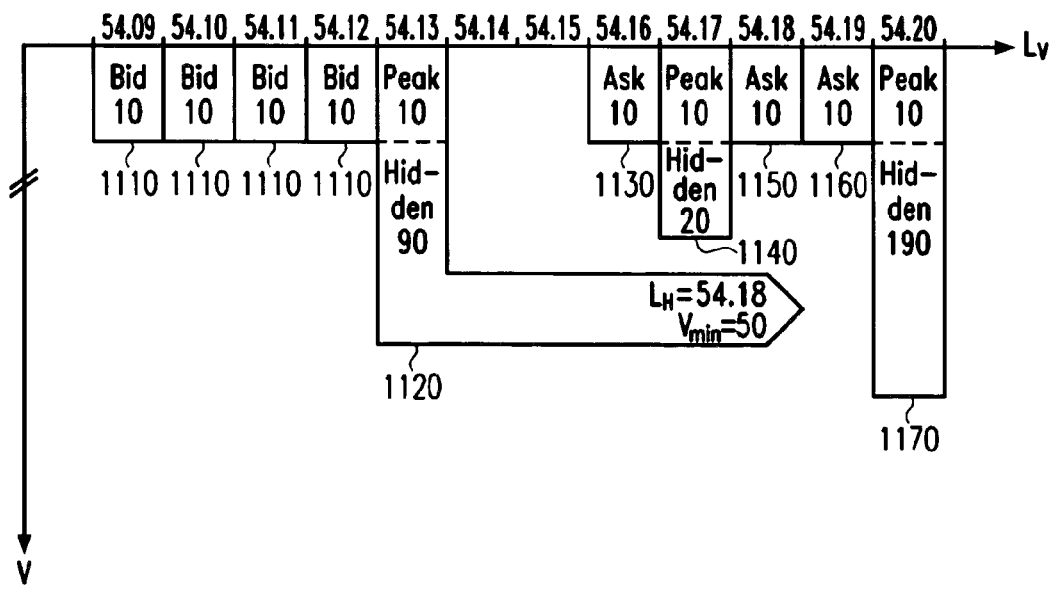
FIG. 11 illustrates another example of an order book situation according to an embodiment.

FIG. 11 illustrates another example of a set of orders within the central order book 450 according to an embodiment. When taking the buy volume order 1120 as the actually processed order, the ask order 1130 may result from the detection step 630 as the best opposite order. In step 640 it may be determined that the opposite order 1130 is not a volume order and the volume order processing may proceed with the combined volume order processing 660. In step 810 of the combined volume order processing 660, it may be detected that the limit of the opposite order 1130 is not better than the visible limit of the actually processed order 1120, step 820 may yield that the limit of the opposite order 1130 is within the conditional range of the actually processed order 1120, and it may result from step 830 that the volume of the opposite order 1130 is inferior to the minimum execution size of the actually processed order 1120. Thus, according to the present embodiment, the detection step 870 may be performed which may return the peak of the iceberg order 1140 as a second best opposite order. Combined opposite order parameters calculated in step 880 may comprise a combined visible limit which may correspond to the highest one of the limits of the best opposite order 1130 and the second best opposite order. The combined opposite parameters may also comprise a combined volume corresponding to the sum of the volume of the best opposite order 1130 and the peak volume of the iceberg order 1140.

In the following, steps 640 and 810 to 830 are performed again according to the embodiment. Since in the depicted example the combined opposite volume is still inferior to the minimum execution size of the actually processed order 1120, a third best opposite order may be detected in step 870. This step may return a second peak of the iceberg order 1140 as a third best opposite order and the steps 880, 640, and 810 to 830 may be performed accordingly. After detecting the third and last peak of the iceberg order 1140 as a forth best opposite order in step 870 and again performing steps 880, 640, and 810 to 830, the sell order 1150 may be determined as a fifth best opposite order in step 870.

Accordingly, step 880 of calculating the combined opposite order parameters may then result in a combined limit of 54.18 and a combined volume of 50. Thus, the next time step 830 is accomplished according to the embodiment, it may be determined that the opposite volume fulfills the condition of being superior or equal to the minimum execution size of the actually processed order 1120. Therefore, 50 shares of the actually processed volume order 1120 may be executed against the 50 shares of the opposite orders 1130 to 1150 in step 840.

During volume order post-transaction processing 850, it may be determined in step 950 that the residual volume of the actually processed order 1120 exceeds the minimum execution size of the actually processed order 1120 and step 960 of converting the remaining part of the volume order 1120 may be skipped. In step 970, the residual volume order 1120, now having a peak volume of 10 and a reduced hidden volume of 40, may be sent to the time stamp generator 430 for re-entering the order processing at step 520 where a new time stamp may be generated.

Figure 12:
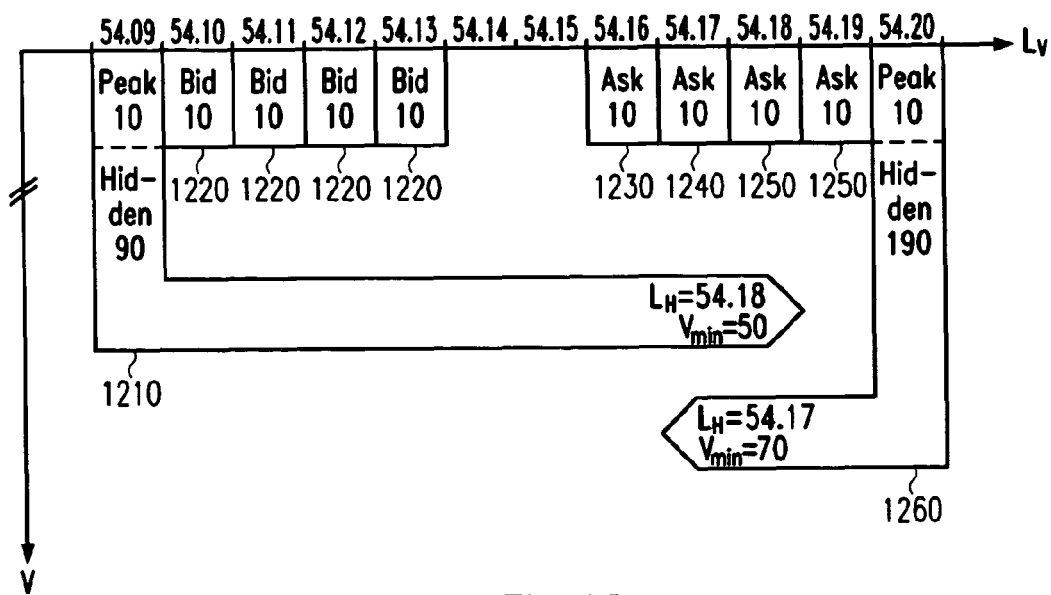
FIG. 12 illustrates a further example of an order book situation according to an embodiment.

In FIG. 12, still another example of a set of orders within the central order book 450 according to an embodiment is depicted. Supposing that the actually processed order may be represented by the buy volume order 1210, the sell order 1230 may result from step 630 of detecting the best opposite order. According to the present embodiment, steps 640 and 810 to 830 are performed corresponding to the process described with respect to FIG. 11.

In the following step 870, the sell order 1240 may be detected as the second best opposite order. Then in step 880, the combined opposite order parameters may be calculated in the same way that has been described with respect to FIG. 11, and steps 640 and 810 to 830 may be performed again. The detection of the third best opposite order in step 870 may yield the sell volume order 1260.

The combined opposite order parameters of the sell orders 1230 and 1240 and the sell volume order 1260 may comprise a combined opposite volume of 220 corresponding to the sum of the volumes of the respective orders, a combined minimum execution size of 90 corresponding to the sum of the minimum execution size of the sell volume order 1260 and the sell orders 1230 and 1240, and a combined hidden limit of 54.17, corresponding to the highest limit among the visible limits of the sell orders 1230 and 1240 and the hidden limit of the sell volume order 1260.

When returning to step 640, it may be determined that the combined opposite order parameters now correspond to a volume order, comprising a hidden limit and a minimum execution size. Consequently, steps 705 and 715 to 725 of the pure volume order processing 650 illustrated in FIGS. 6 and 7 may be accomplished according to the embodiment, and the entire buy volume order 1210 may be executed against the sell orders 1230 and 1240 and 80 shares of the sell volume order 1260.

As discussed above, volume orders may also match in the market depth according to the same principles as described with respect to FIG. 3. Furthermore, the minimum execution size may be satisfied with the inclusion of visible regular sizes and/or hidden iceberg order sizes. Full order book integration of volume orders may include visible sizes by clean-up print executions (10 shares of each of the sell orders 1230 and 1240 at 54.16 and 54.17, respectively, according to FIG. 12) before the remaining volume order size matches against the overlap of the second volume order at midpoint price discovery (in FIG. 12: at 54.175) or any other method of price discovery. The principle of clean-up prints may ensure full order book integration and consistency with price-time priority.

Figure 13:
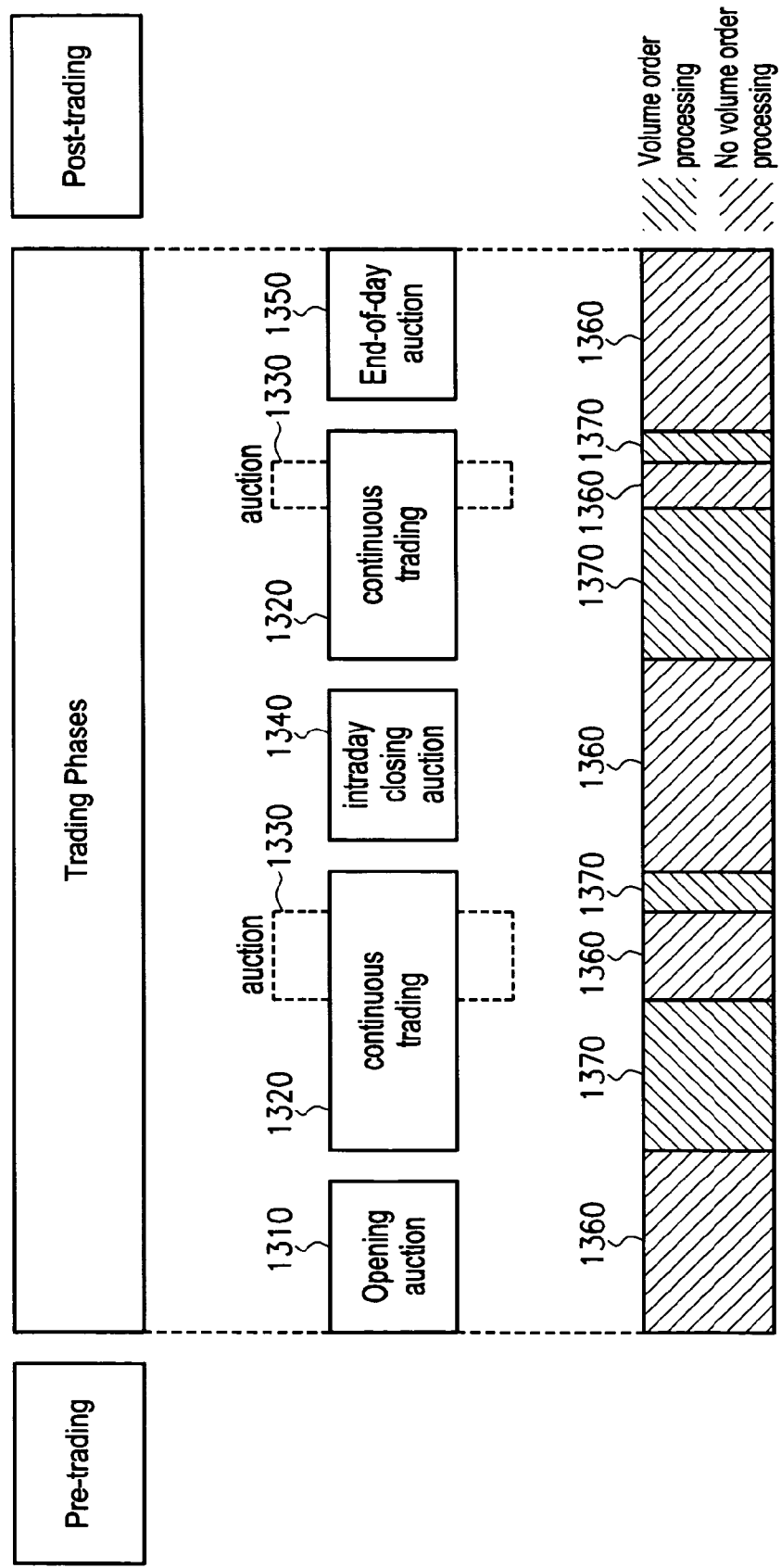
FIG. 13 illustrates an example of the interaction of trading phases and the system of the invention.

Turning now back to step 550 where it is determined whether the order book exchange system 420 currently operates in a continuous trading phase, the processing of volume orders may be preferably possible during defined exchange trading hours between the end of the opening auction 1310 and the start of the closing auction 1340 or the end-of-day auction 1350. This is shown in FIG. 13.

Between the pre-trading phase and the post-trading phase there may be a number of trading phases such as auctions 1310 and 1330 to 1350, and continuous trading phases 1320. A continuous trading phase may be a trading phase with ongoing price determination where each incoming order may be instantly checked to determine whether it can be matched. During continuous trading, the order book is always open. Continuous trading phases 1320 might be interrupted by auctions 1330 or by trading safeguards, i.e., volatility or market order interruptions which may result in an auction call. Preferably, the volume order processing capability of the order book exchange system 420 is disabled during all auctions. Thus, the trading day may be understood as a sequence of time periods 1370 in which the volume order processing functionality is enabled and time periods 1360 where no volume order processing is performed and existing volume orders may be regarded as conventional orders characterized by their visible limit and overall volume.

As apparent from the above description of embodiments, back-end functionality for the matching of trading interests on the basis of hidden limits and hidden volumes is provided. In particular, electronic order book trading of interests may be provided using a hidden limit to continuously search for matching hidden volume in the inside market or hidden and visible volume in the market depth on both sides of the market. A portion of the total trading interest may remain undisclosed to the relevant market and may get executed only when its hidden limit is met by a minimum executable hidden or visible size. The discussed embodiments may provide the integrated exposure of large trading interests to automatic execution in continuous electronic order book trading by searching the inside market or respective market depth. The search may apply a hidden limit to scan for a matching minimum volume without revealing the large trading interest in total to the market.

As disclosed above, the execution likelihood for large trading interests by full order book interaction may be increased and the bipolarity between patient and aggressive orders may be broken up. Moreover, the described embodiments may reduce both market impact and opportunity costs and enable for price discovery within or beyond the inside market. Thus, the embodiments may be particularly suitable for allowing fast execution of large trading interests with minimized market impact and opportunity costs in electronic order book trading.

The presented volume orders may be fully integrated with electronic order book trading and may enhance the trading system's market model and functionality. They may extend the iceberg order functionality by two parameters: the hidden limit and the minimum execution size. The hidden limit may be specified additionally to the visible order limit and enable to discover hidden volume in the inside market and/or in the market depth of the opposite side. The minimum execution size may ensure that the aggressive volume order part does not get executed unlimited and may allow specifying a minimum threshold size when an execution on basis of the hidden limit is acceptable, ahead of the visible limit. Thus, in the described embodiments, the minimum execution size may ensure a sufficiently large execution size for large trading interests and prevent volume orders from gaming.

According to the presented embodiments, volume order processing may allow for new matching principles in continuous electronic order book trading. This may include providing new market models allowing for the matching of hidden volumes within the market depth. Volume orders may be matched passively on their own market side or match actively with corresponding hidden volume order sizes in the inside market or with hidden and/or visible sizes on the opposite market side. When positioned on top of the order book at the inside market with its visible limit, a volume order may receive regular order book execution and participate in public price discovery, e.g., the volume order may be executed against one or more opposite market orders, opposite limit or iceberg orders or any combination thereof Further, the interaction of volume orders with continuous electronic order book trading may ensure full price-time priority in order book trading. This may include possible clean-up prints of price-time prioritized orders, i.e., the partial execution of a volume order against opposite conventional orders before matching with an opposite volume order when matching on the opposite market side with its hidden limit.

While prior art matching systems are based on front-end functionality only, i.e., act only on the visible liquidity in the market that is disclosed to all market participants, the proposed embodiments provide also back-end functionality. This may allow for hidden liquidity not disclosed to all market participants to interact both with other hidden liquidity and visible liquidity in the market.

As discussed above, volume orders may not only be executable/executed when entering the order book. Also a change of the order book situation, even when induced by a non-volume order, may lead to rendering a waiting volume order executable. Therefore, the executability of a volume order may be verified not only when the volume order is entering the order book, but continuously.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

The invention claimed is:

1. A method of processing orders in a security trading system by one or more computing devices, the method comprising:

receiving, by at least one of the one or more computing devices, a buy order comprising an upper limit and a conditional upper limit, wherein the upper limit and the conditional upper limit define a conditional buying price range in which the buy order can be executed under certain buying conditions;

receiving, by at least one of the one or more computing devices, a sell order comprising a lower limit, a visible sell volume parameter and a hidden sell volume parameter;

determining, by at least one of the one or more computing devices, whether said certain buying conditions are fulfilled; and executing, by at least one of the one or more computing devices, the buy order and the sell order against each other if at least said certain buying conditions are fulfilled;

wherein the visible sell volume parameter specifies a first part of the volume of the sell order intended to be disclosed to all the customers of the security trading system;

wherein the hidden sell volume parameter specifies a second part of the volume of the sell order intended not to be disclosed to all the customers of the security trading system; and wherein determining whether said certain buying conditions are fulfilled comprises determining whether the sum of said first part and said second part of the volume of the sell order is superior or equal to a threshold volume.

2. The method of claim 1, wherein the one or more computing devices comprise at least one client computer for receiving orders from customers via the at least one client computer.

3. The method of claim 2, wherein a time stamp is generated for each of the orders received from the customers and the time stamp is associated with the respective order.

4. The method of claim 3, wherein the received orders comprise at least one of visible order parameters intended to be disclosed to all the customers and hidden order parameters intended not to be disclosed to all the customers; and wherein a central order book stores the order parameters, the central order book comprising a visible order book that stores the visible order parameters disclosed to all the customers and a hidden order book that stores the hidden order parameters not disclosed to all the customers.

5. The method of claim 4, wherein a data separating unit separates the visible order parameters from the hidden order parameters, forwards the visible order parameters to the visible order book, and forwards the hidden order parameters to the hidden order book.

6. The method of claim 2, wherein an order processing unit matches the sell order and the buy order against each other.

7. The method of claim 6, wherein the order processing unit determines whether said certain selling conditions are fulfilled.

8. The method of claim 6, wherein the order processing unit executes the sell order and the buy order against each other if at least said certain selling conditions are fulfilled.

9. An apparatus for processing orders, the apparatus comprising:
one or more processors; and
one or more memories operatively coupled to at least one of the one or more processors and having instructions stored thereon that, when executed by at least one of the one or more processors, cause at least one of the one or more processors to:
receive a buy order comprising an upper limit and a conditional upper limit, wherein the upper limit and the conditional upper limit define a conditional buying price range in which the buy order can be executed under certain buying conditions;
receive a sell order comprising a lower limit, a visible sell volume parameter and a hidden sell volume parameter;
determine whether said certain buying conditions are fulfilled; and
execute the buy order and the sell order against each other if at least said certain buying conditions are fulfilled;
wherein the visible sell volume parameter specifies a first part of the volume of the sell order intended to be disclosed to all the customers of the security trading system;
wherein the hidden sell volume parameter specifies a second part of the volume of the sell order intended not to be disclosed to all the customers of the security trading system; and
wherein determining whether said certain buying conditions are fulfilled comprises determining whether the sum of said first part and said second part of the volume of the sell order is superior or equal to a threshold volume.

10. At least one non-transitory computer-readable medium storing computer-readable instructions that, when executed by one or more computing devices, cause at least one of the one or more computing devices to:
receive a buy order comprising an upper limit and a conditional upper limit, wherein the upper limit and the conditional upper limit define a conditional buying price range in which the buy order can be executed under certain buying conditions;
receive a sell order comprising a lower limit, a visible sell volume parameter and a hidden sell volume parameter;
determine whether said certain buying conditions are fulfilled; and
execute the buy order and the sell order against each other if at least said certain buying conditions are fulfilled;
wherein the visible sell volume parameter specifies a first part of the volume of the sell order intended to be disclosed to all the customers of the security trading system;
wherein the hidden sell volume parameter specifies a second part of the volume of the sell order intended not to be disclosed to all the customers of the security trading system; and
wherein determining whether said certain buying conditions are fulfilled comprises determining whether the sum of said first part and said second part of the volume of the sell order is superior or equal to a threshold volume.

11. A server apparatus for processing orders, the apparatus comprising:
one or more processors; and
one or more memories operatively coupled to at least one of the one or more processors and having instructions stored thereon that, when executed by at least one of the one or more processors, cause at least one of the one or more processors to:
receive from at least one client computer system a buy order comprising an upper limit and a conditional upper limit, wherein the upper limit and the conditional upper limit define a conditional buying price range in which the buy order can be executed under certain buying conditions;
receive from the at least one client computer system a sell order comprising a lower limit, a visible sell volume parameter and a hidden sell volume parameter;
determine whether said certain buying conditions are fulfilled; and
execute the buy order and the sell order against each other if at least said certain buying conditions are fulfilled;
wherein the visible sell volume parameter specifies a first part of the volume of the sell order intended to be disclosed to all the customers of the security trading system;
wherein the hidden sell volume parameter specifies a second part of the volume of the sell order intended not to be disclosed to all the customers of the security trading system; and wherein determining whether said certain buying conditions are fulfilled comprises determining whether the sum of said first part and said second part of the volume of the sell order is superior or equal to a threshold volume.

12. A client apparatus for generating orders, the apparatus comprising:

one or more processors; and one or more memories operatively coupled to at least one of the one or more processors and having instructions stored thereon that, when executed by at least one of the one or more processors, cause at least one of the one or more processors to:

generate a buy order comprising an upper limit and a conditional upper limit, wherein the upper limit and the conditional upper limit define a conditional buying price range in which the buy order can be executed under certain buying conditions;

wherein the buy order is adapted to be executed against a sell order comprising a lower limit, a visible sell volume parameter specifying a first part of the volume of the sell order intended to be disclosed to all the customers of the security trading system, and a hidden sell volume parameter specifying a second part of the volume of the sell order intended not to be disclosed to all the customers of the security trading system, if at least said certain buying conditions are fulfilled, wherein said certain buying conditions include a condition that the sum of said first part and said second part of the volume of the sell order is superior or equal to a threshold volume.

* * * * *